No. 862,830. PATENTED AUG. 6, 1907.
J. G. LEWIS.
SEWING MACHINE.
APPLICATION FILED AUG. 2, 1902.
7 SHEETS—SHEET 5.
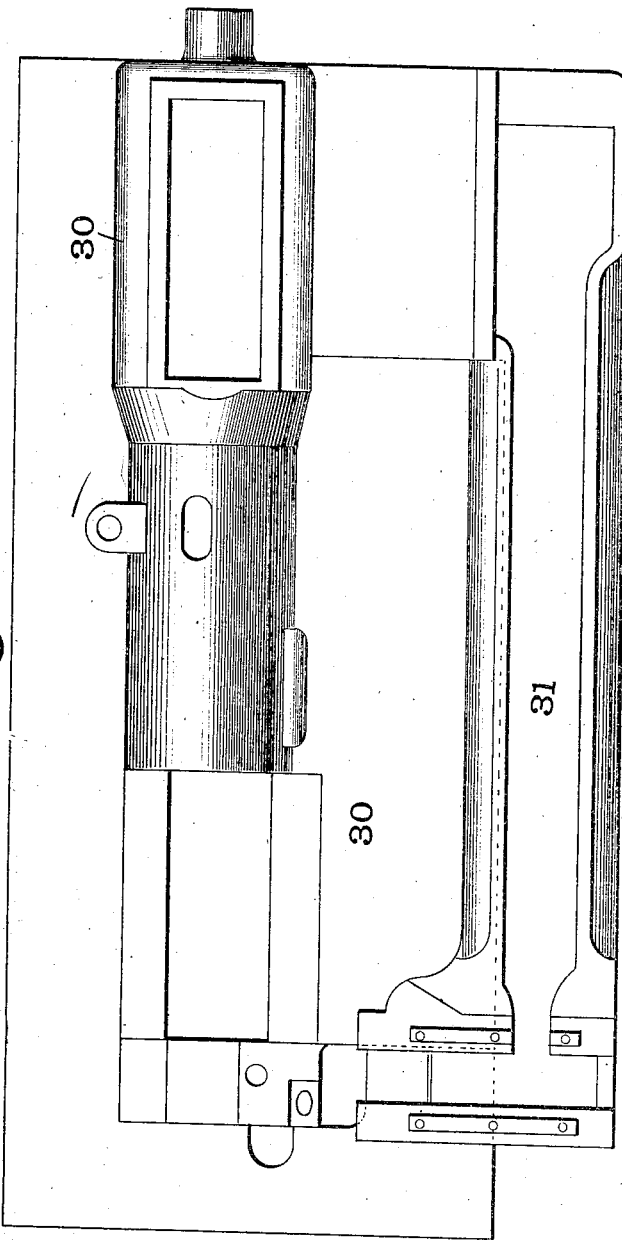
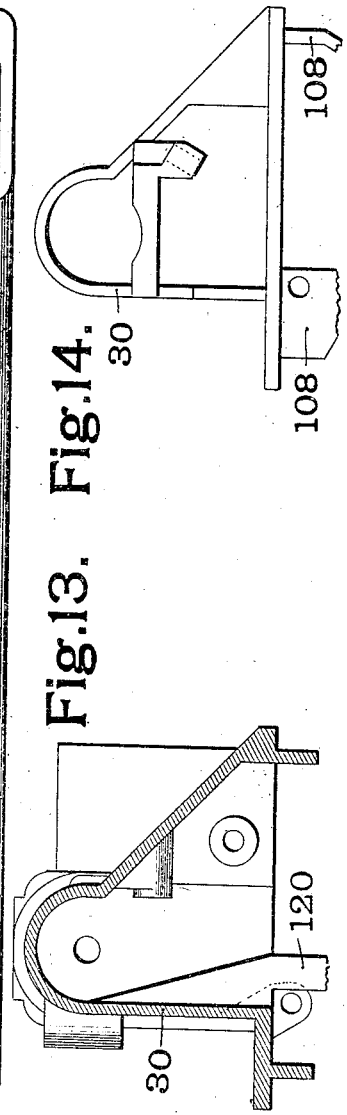
Witnesses
W. A. Alexander
L. D. Beach
Inventor
John G. Lewis
By Attorneys Fowler & Bryson No. 862,830. PATENTED AUG. 6, 1907.
J. G. LEWIS.
SEWING MACHINE.
APPLICATION FILED AUG. 2, 1902.

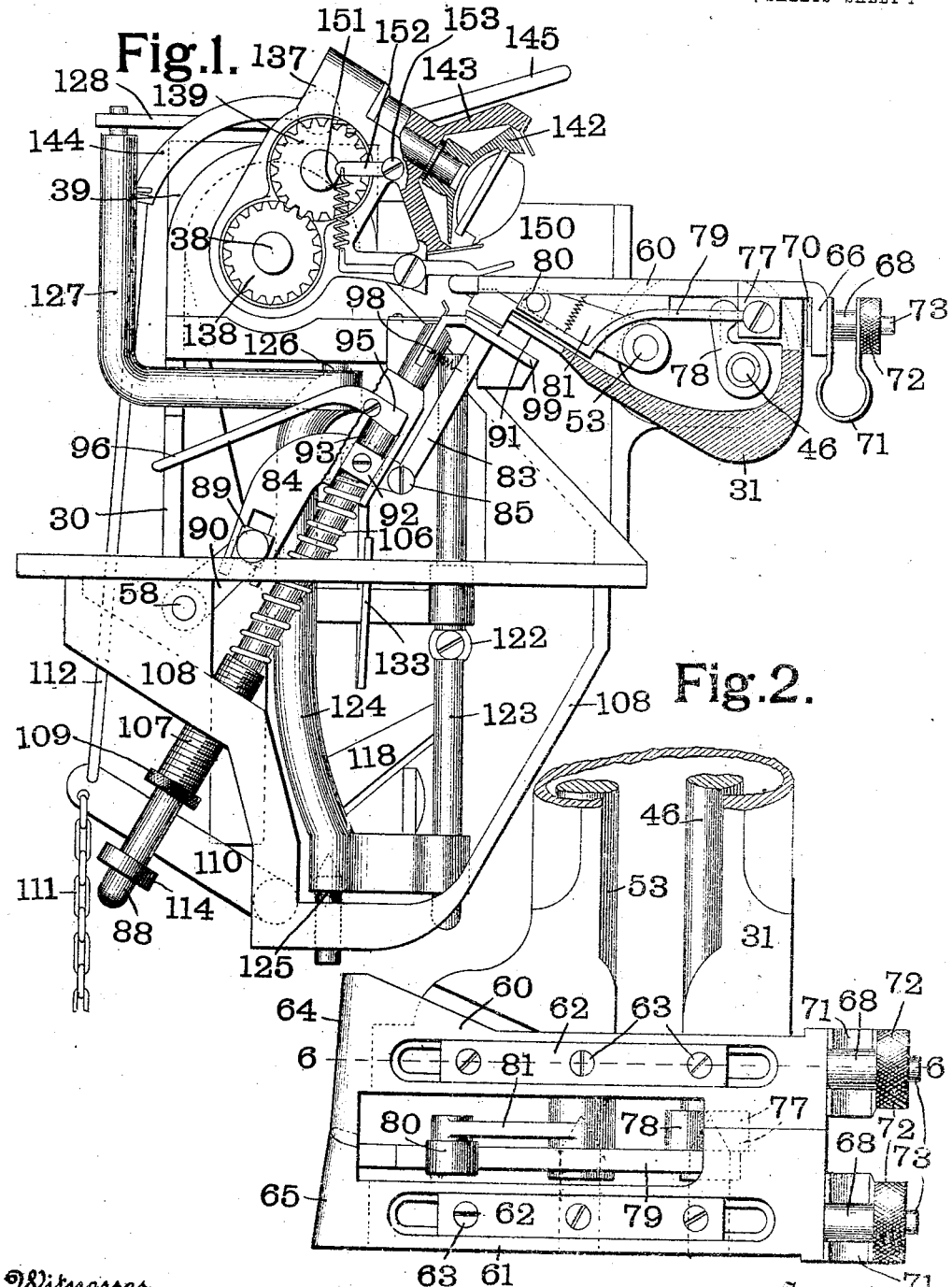

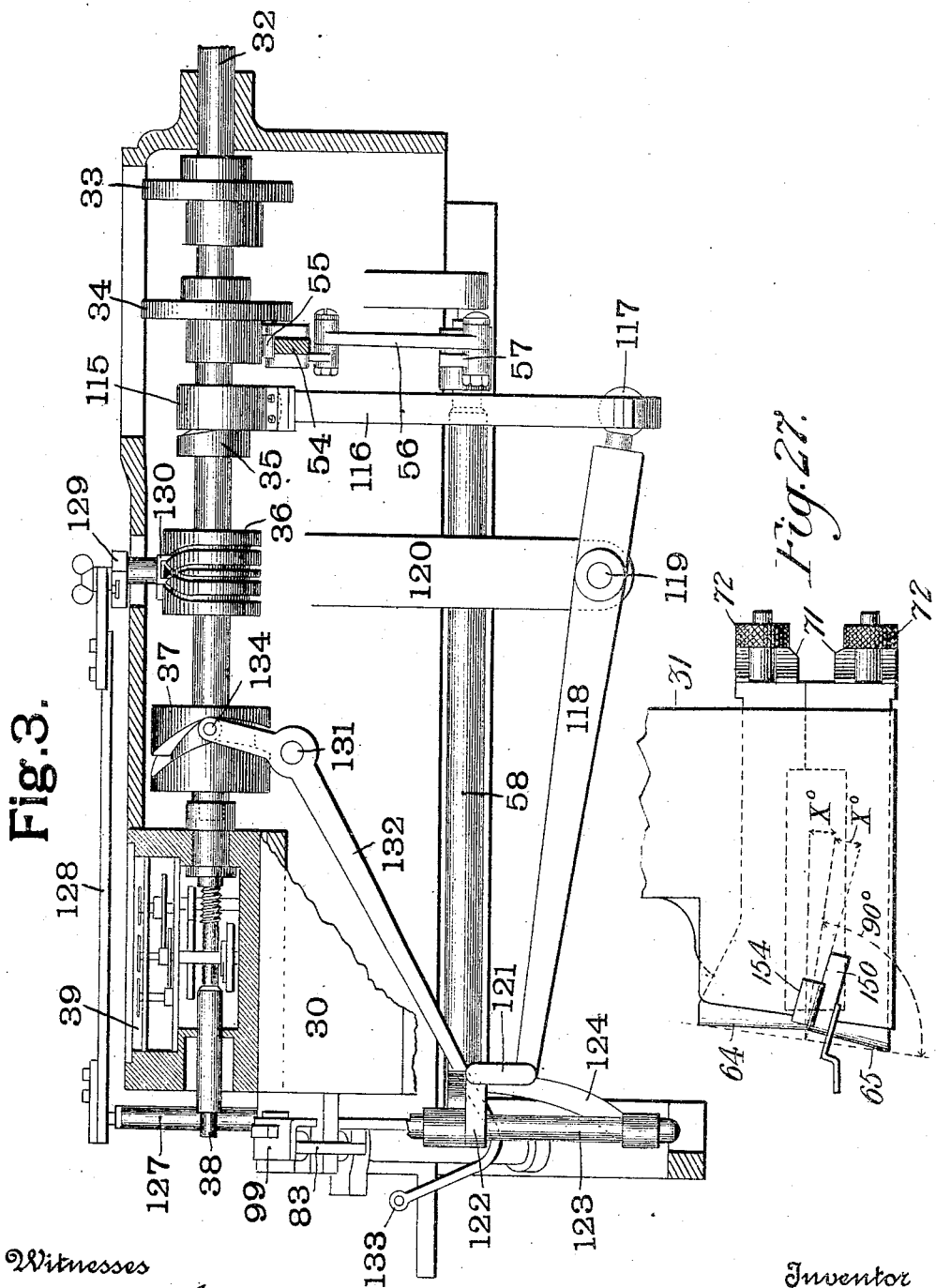

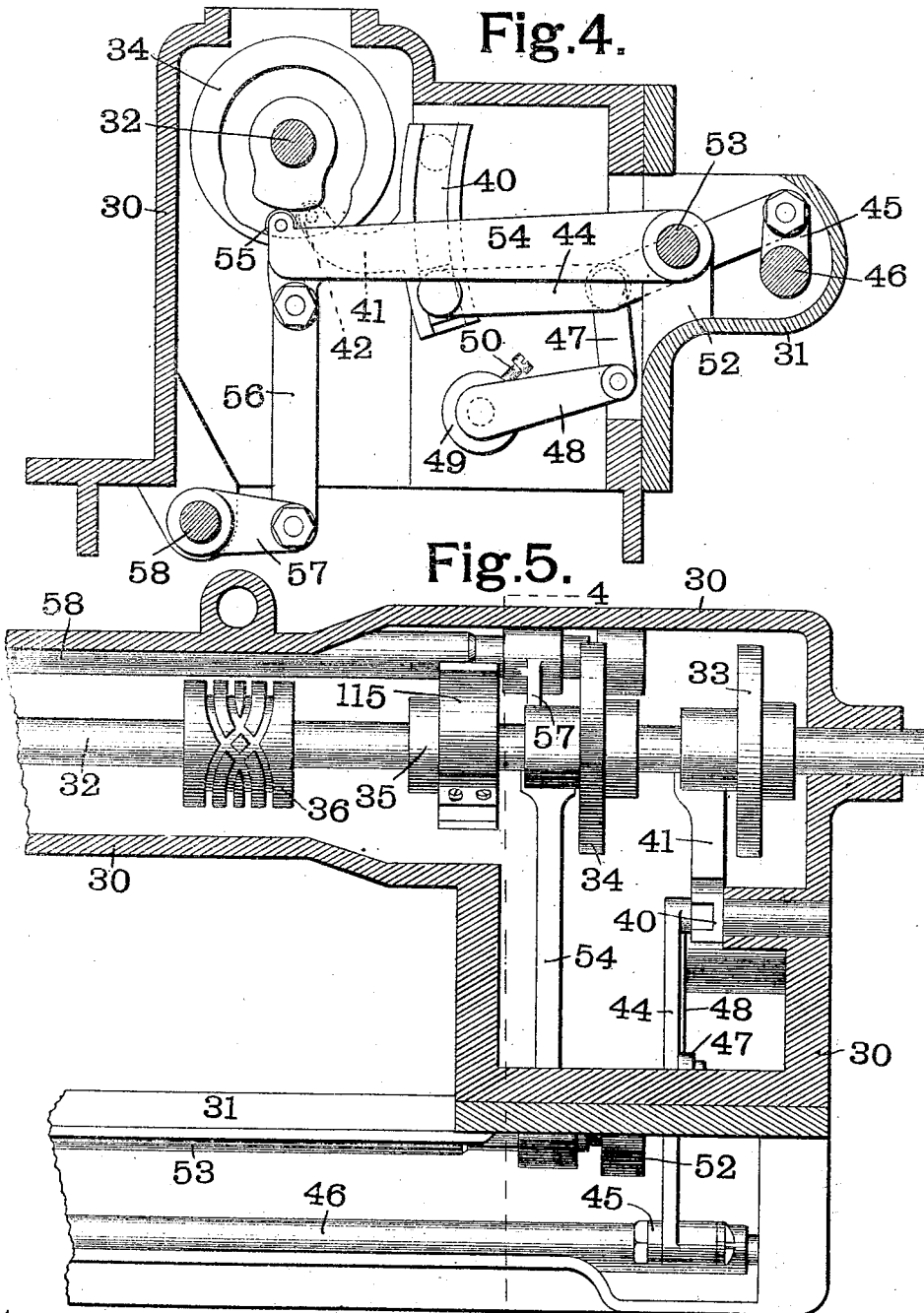

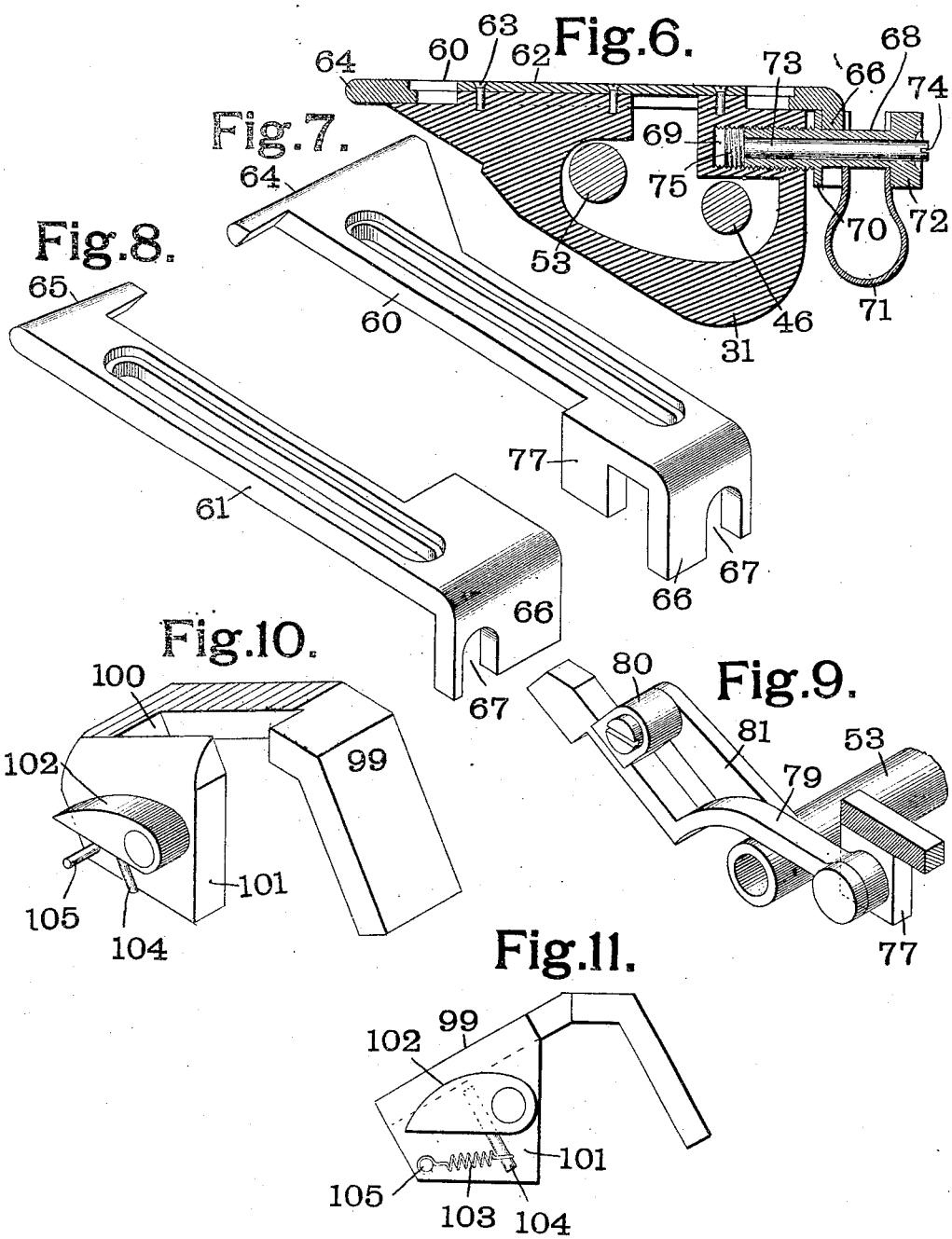

7 SHEETS—SHEET 6.

Witnesses
W. H. Alexander
L. B. Beach.

Inventor
John G. Lewis
By Attorneys
Fowler & Bryson

No. 862,830. PATENTED AUG. 6, 1907.
J. G. LEWIS.
SEWING MACHINE.
APPLICATION FILED AUG. 2, 1902.
7 SHEETS—SHEET 7.
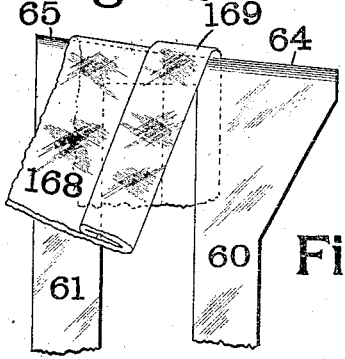
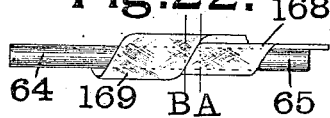
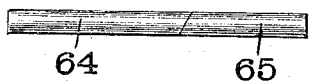
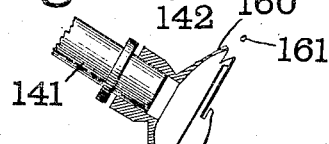
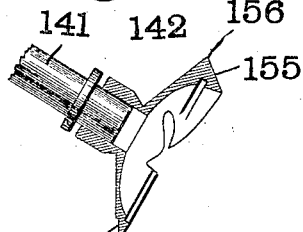
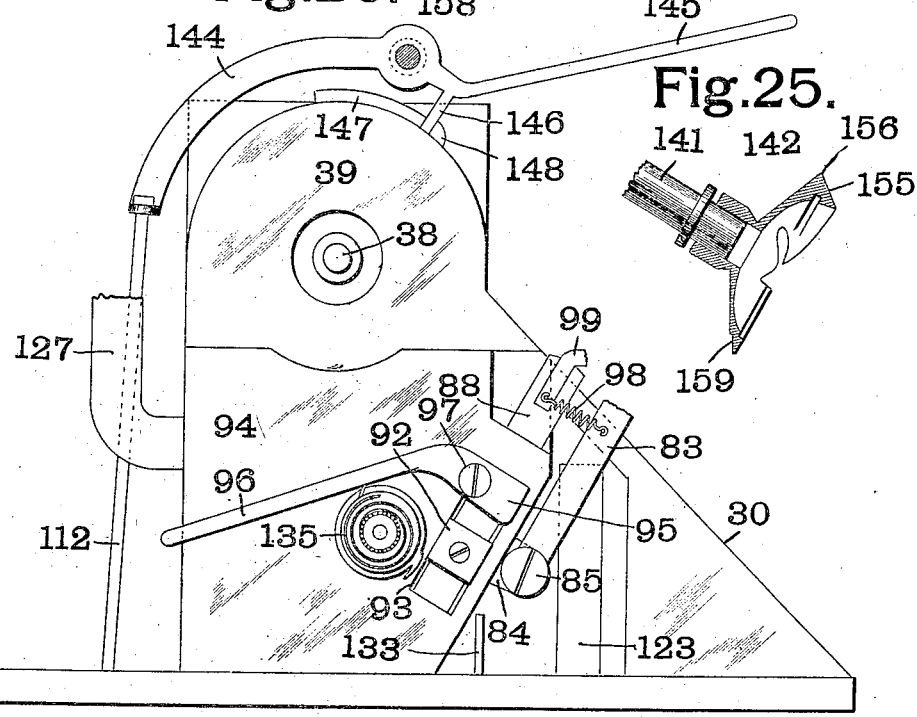
Witnesses
W. H. Alexander
L. B. Peach
Inventor
John G. Lewis
By his Attorneys
Fowler & Bryson

UNITED STATES PATENT OFFICE.

JOHN G. LEWIS, OF ST. LOUIS, MISSOURI, ASSIGNOR TO LEWIS BLIND STITCH MACHINE COMPANY, OF ST. LOUIS, MISSOURI, A CORPORATION OF MISSOURI.

SEWING-MACHINE.

No. 862,830.    Specification of Letters Patent.    Patented Aug. 6, 1907.

Application filed August 2, 1902. Serial No. 118,144.

*To all whom it may concern:*

Be it known that I, JOHN G. LEWIS, a citizen of the United States, residing at the city of St. Louis, in the State of Missouri, have invented a certain new and useful Sewing-Machine, of which the following is such a full, clear, and exact description as will enable any one skilled in the art to which it appertains to make and use the same, reference being had to the accompanying drawings, forming part of this specification.
My invention relates to sewing machines, and more particularly to blind stitch sewing machines, that is, machines making stitches which enter and leave the same side of the goods, and which are locked or enchained upon the said side.
The object of my invention is to simplify the construction of blind stitch sewing machines, and to provide mechanism whereby stitches can be made which are invisible on the opposite side of the goods to that on which the stitches are made, but which are locked or enchained upon the side or face of the goods upon which the needle enters and which can be also concealed, or nearly so on the side of the goods in which the stitches are made.

Figure 15:
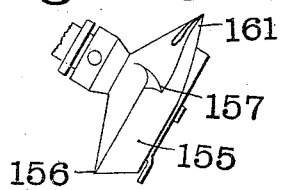
Figure 16:
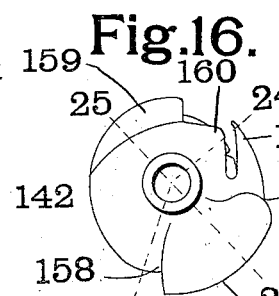
Figure 17:
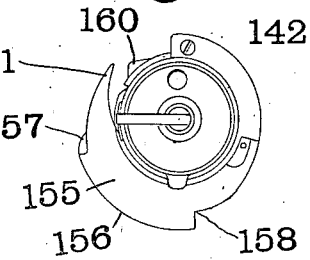
Figure 18:
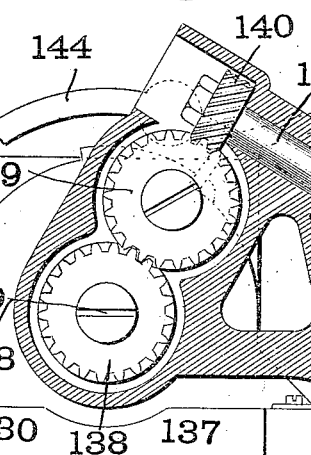
Figure 19:
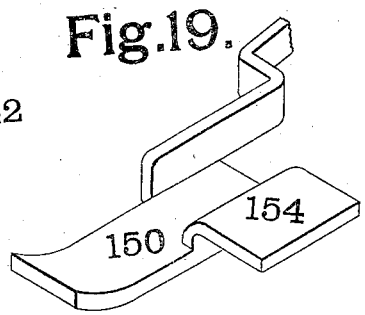
Figure 20:
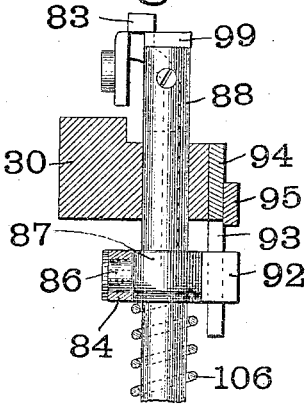

In the accompanying drawings, which illustrate one form of sewing machine made in accordance with my invention, Figure 1 is an end view, the arm being shown in section and the end plate being broken away; Fig. 2 is a slightly enlarged top plan view of the end of the arm and the back guide carried thereby; Fig. 3 is a longitudinal vertical section; Fig. 4 is a vertical cross section on line 4—4 of Fig. 5; Fig. 5 is a horizontal section of one end of the machine; Fig. 6 is a section on the line 6—6 of Fig. 2; Figs. 7 and 8 are isometric projections of the two parts of the back guide;
Fig. 9 is an isometric projection showing the feed dog and connections; Figs. 10 and 11 are an isometric projection and a side elevation respectively of the presser-foot; Fig. 12 is a top plan view, on a reduced scale, of the casing of the machine; Figs. 13 and 14 are a section and an end view respectively of the casing; Fig. 15 is a side elevation of the rotary hook; Fig. 16 is a rear view of the hook; Fig. 17 is a front view of the hook; Fig. 18 is a sectional view showing the hook and connections together with the needle and the needle bar; Fig. 19 is an enlarged isometric projection of the drag-foot; Fig. 20 is a sectional view showing the presser-foot bar; Fig. 21 is a top plan view of the back guide showing the goods in position; Fig. 22 is a front view of the back guide with the goods around same; Fig. 23 is a view similar to Fig. 22 but without the goods; Fig. 24 is a section on the line 24—24 of Fig. 16; Fig. 25 is a section on the line 25—25 of Fig. 16; Fig. 26 is an end view of the body of the machine, the end plate being in position, and Fig. 27 is a top plan view showing the work plate and drag foot.

Like marks of reference refer to similar parts in the several views of the drawings.

30 is the main casing or housing of the machine, said casing or housing 30 has secured to it an arm 31 which extends parallel with the casing 30, as best shown in Fig. 12. Journaled in the main casing 30 is the main shaft 32 of the machine. (See Figs. 3, 4 & 5). On the shaft 32 are two cams 33 and 34 which operate the feeding mechanism as will be hereinafter described. On the shaft 32 is an eccentric 35 and switch cam 36 for operating the needle bar and a cam 37 for operating the take up. The shaft 32 is connected to the shaft 38 of a meter 39 which is set into the main housing or casing 30.

Pivoted to the housing 30 is a segmental guide 40 which is provided with an arm 41 (Figs. 4 and 5) carrying a roller 42. The roller 42 engages with the track of the cam 33 on the main shaft 32. Engaging with the guide 40 is one end of a link 44, the opposite end of which is pivoted to a rocker arm 45 carried on a rock shaft 46, passing through the arm 31 of the machine. The link 44 is supported by means of a link 47 pivoted to one end of an arm 48. This arm 48 is secured in a boss 49 by means of a set screw 50. By loosening the set screw 50 the arm 48 can be raised or lowered, thus changing the point of engagement of the end of the link 44 with the guide 40 and thus changing the length of the stitch as will be hereinafter described.

Carried by the arm 31 is a lug 52, in which is journaled a rock shaft 53 extending through the arm of the machine parallel with the shaft 46.

Rigidly carried by the shaft 53 is an arm 54 provided with a roller 55 which engages with the track of the cam 34.

Pivoted to the end of the arm 54 is one end of a link 56, the opposite end of which is pivoted to a short rocker arm 57 rigidly secured to a rock shaft 58, extending longitudinally of the machine parallel with the main shaft 32 and the shafts 46 and 53 hereinbefore described.

60 and 61 (Figs. 1, 2, 6, 7 & 8) are the two parts of the back guide which are slidingly mounted on the end of the arm 31 by means of a guide plate 62, held in position by screws 63. The ends of the parts 60 and 61 of the back guide are rounded and form two working faces 64 and 65, respectively, which are arranged at a slight angle to each other, as is best shown in Figs. 2 and 21, so as to form a reëntrant working face for the complete back guide.

Each of the parts 60 and 61 is provided with a downwardly projecting portion 66 in which is formed a slot 67, which slot 67 is placed over a sleeve 68. One end of the said sleeve 68 is threaded and enters a threaded opening 69 (Fig. 6) in the arm 31. The inner face of the downward projection 66 rests against a collar 70 formed on the sleeve 68.

Bearing against the outer face of the projection 66 is one end of a U-shaped spring 71, the other end of which rests against a milled head 7´; formed on the sleeve 68. Passing through the sleeve 68 is a rod 73 having formed in its outer end a slot 74 for the reception of a screw driver.

Formed on the inner end of the rod 73 is a screw-threaded head 75 which engages with the threaded opening 69 and is adapted to lock the sleeve 68.

Each of the parts 60 and 61 is also provided with a downwardly projecting portion 77 against the edges of which bears the rounded end of a rocker arm 78 (Fig. 1) rigidly carried on the shaft 46.

To the projection 77, carried on the part 61, is pivoted a feed dog 79 (Figs. 1, 2 and 9). Bearing against the upper side of the feed dog 79 is a block 80 pivotally mounted on an arm 81 rigidly secured to the rock shaft 53. Coöperating with the feed dog 79 is a walking foot 83 (Figs. 1, 20 and 26) which is pivoted to one end of a bell-crank lever 84 by means of a screw 85. The bell-crank lever 84 is pivoted at 86 (Fig. 20) to a collar 87 secured to the presser-foot bar 88. The opposite end of the bell-crank lever 84 is bifurcated and engages with a block 89 pivoted to an arm 90 rigidly secured to the rock shaft 58. The collar 87 is provided with a square projection 92 which extends through a slot 93 in the end plate 94 of the machine. This projection 92 is adapted to be acted upon by the cam end 95 of a lever 96 which is pivoted to the end plate 94 by means of a screw 97 (Fig. 26). The walking foot 83 is connected to the presser-foot bar 88 by means of a coil spring 98.

Secured in the upper end of the presser-foot bar 88 is the presser-foot 99, shown in detail in Figs. 10 and 11. The presser-foot 99 is adapted to clamp the goods against the work plate 91 carried on the under face of the arm 31 and is provided with a slot 100 through which projects the walking foot 83. The presser-foot 99 is provided with a downward projection 101 on which is pivotally mounted an auxiliary presser-foot 102. The auxiliary presser-foot 102 is held against the work by means of a coil spring 103 secured, at one end, to a pin 104 in said auxiliary presser-foot and, at the other end, to a pin 105 on the downward projection 101. The presser-foot bar 88 is surrounded by a coil spring 106, one end of which rests against the collar 87 and the other end of which rests against a threaded sleeve 107 (Fig. 1) passing through a downwardly extending yoke 108 carried by the main housing 30. The sleeve 107 is provided with a milled head 109 by means of which it can be turned to adjust the tension of the spring 106. Pivoted to the yoke 108 is a link 110 which engages with a collar 114 on the end of the presser-foot bar 88. The link 110 has attached to it a chain 111 by means of which the presser-foot may be drawn out of engagement with the work. The link 110 also has pivoted to it a rod 112, the purpose of which will be hereinafter described.

Surrounding the eccentric 35 is an eccentric strap 115 (Fig. 3) carrying a connecting rod 116. This connecting rod 116 is attached by means of a ball and socket joint 117 to a lever 118. The lever 118 is pivoted at 119 to a downwardly projecting lug 120 carried by the main casing 30. The opposite end of the lever 118 is connected by means of a link 121 with a collar 122 rigidly secured to the needle bar 123. The needle bar 123 is slidingly mounted in a yoke 124 pivoted at points 125 and 126 (Fig. 1) and provided with a rearwardly and upwardly extending L-shaped arm 127. The arm 127 is connected by means of a rod 128 to a pivoted segment 129 (Fig. 3). The segment 129 is provided with a shoe 130 which engages with the track of the switch cam 36 heretofore described.

Pivoted to the interior of the casing 30 by means of a screw 131 is a lever 132, the outer end 133 of which acts as a take up. The inner end is provided with a roller 134 which engages with the track of the cam 37 upon the main shaft 32. 135 (Fig. 26) is a tension device of the usual construction carried by the end plate 94. Surrounding the end of the shaft 38 of the meter box is a gear casing 137 containing two spiral gears 138 and 139 respectively (Figs. 1 & 18). The gear 138 is rigidly secured to the shaft 38 and meshes with the gear 139. The gear 139 meshes with a small spiral gear 140 secured to the spindle 141 of the rotary hook 142. The hook 142 is provided with a casing 143 preferably made integral with the gear casing 137.

Pivoted to the gear casing 137 is a lever 144, the rear end of which is connected to the rod 112 hereinbefore described. The lever 144 is provided with a forwardly projecting portion 145 from which extends a catch 146 adapted to engage with stops 147 and 148 (Fig. 26) on the rounded forward end of the meter box 39.

Pivoted to the gear casing 137 is a drag-foot 150 shown in detail in Fig. 19. This drag-foot 150 is adapted to hold the work against the upper side of the back guide. It is held in position by means of a coil spring 151 (Fig. 1), one end of which is attached to the rear end of said drag-foot 150, and the other end of which is attached to an arm 152 adjustably attached to the gear casing 137 by means of a screw 153. By loosening this screw 153 the arm 152 can be adjusted to vary the tension of the spring 151. The drag-foot 150 is provided with a wing 154 (Fig. 19) which is adapted to act as an edge guide for the superimposed portion of the seam or hem. The drag-foot and consequently the edge-guide is inclined to the path of the goods at the point of feed as is best illustrated in Fig. 27. This inclination is such that the line indicating the travel of the goods at the point of the feed and the line indicating the inclination of the drag-foot and edge-guide make equal angles with a line at 90° to a line touching the extreme points of the back-guide. This construction is clearly shown in Fig. 27 and insures the feed of the goods at the proper angle to the back-guide in order to accomplish the functions hereinafter more fully set forth in connection with the operation of the machine.

The rotary hook 142, as will be seen from the drawings, is inclined to the path of reciprocation of the needle. The rear face of the hook 142 is conical so as to present a face parallel to the needle except at certain points of its circumference as hereinafter described. A thickened portion 156 is provided so as to form an offset 157 to throw the loop onto the cast-off surface 155. In this type of air hook, i. e., a hook which on its outside 13 periphery does not travel in a race way, it is customary to take the loop from the needle on the rear side or face of the hook and discharge it over the outer or front face of the hook and around the bobbin case. Hence it is necessary for the needle to pass the beak of the hook on the rear face and there form the loop. By arranging this hook at an angle to the reciprocation of the needle, the function of more ready discharge is accomplished by bringing the beak of the hook further toward the outer or front face of the hook, thus having less distance to carry the thread forward, and the thread-carrying space 157, revolving with the hook as it revolves, carries the loop of needle thread forward laterally away from the needle, thus causing it to cast off more easily over the front face of the hook. At the opposite side of this thickened portion 156 of the hook is a cut-away portion 158 which forms a needle guide for deflecting the needle. The hook 142 is also provided with a path 159 for the needle thread to prevent chafing of the thread between the needle and the hook, and is also provided with a bridge 160 for supporting the point of the needle while the loop is being taken by the beak 161.

Secured in the needle bar 123 is a needle 165. The point of the needle 165 is substantially in line with the side of the needle toward the back guide and the needle is slightly inclined away from the guide as shown in Fig. 18. In order to bring the needle into alinement I secure to the casing 30 a rigid needle guide 166 which brings the needle into alinement as it passes the guide. As the needle when free is inclined it is under tension when brought into alinement by the needle guide, that is, it is held against the guide by its own elasticity and it is thus prevented from vibrating while passing the back guide.

168 represents the main body of the goods and 169 the turned over or superimposed portion of the same. (Figs. 21 & 22).

It will be noted that the thrust of the needle is in the direction opposite to the feed of the goods and consequently the thrust of the needle will tend to draw the goods in opposition to the feed mechanism and thus insure the goods being held tightly around the guide at all times. If the thrust of the needle were in the opposite direction the tendency would be to loosen the goods around the guide and consequently allow the stitches to show through on the back or right side of the goods. In order, however, that the needle may not feed the goods backwards in any of the paths of reciprocation it is necessary that both the main layer and the auxiliary layer of goods be firmly held in position during the thrust of the needle and to this end the feeding mechanism is provided with the main and auxiliary presser-feet as has been hereinbefore described.

The operation of my machine is as follows; The goods 168 are passed around the back guide; the portion 169 being turned over or superimposed upon the main layer as shown in Figs. 21 and 22. The main portion of the goods beneath the back guide is clamped against the work plate 91 by the presser-foot 99, and the superimposed portion is clamped by the auxiliary presser-foot 102, while the main portion of the goods above the back guide is held by the drag foot 150. As the auxiliary presser-foot is yieldingly mounted the extra thickness of the superimposed portion of the goods does not hold the main presser-foot out of contact with the main layer of goods. Thus both the main and superimposed layers of goods are firmly held so that the goods are not forced out of place by the needle when it is entering the goods. Vertical movement is imparted to the needle bar from the eccentric 35 by means of the strap 115 connecting rod 116, lever 118 and link 121. Lateral movement is communicated to the needle bar by means of the switch cam 36, connecting rod 128 and arm 127 in the usual manner. As the needle 165 moves upward it strikes the inclined face of the needle guide 166 which brings the needle into alinement as it passes the back guide. It will thus be seen that the needle while passing the guide is in alinement and at the same time is under tension so as to prevent all vibration of the needle thus insuring its passage at the proper distance from the back guide. The needle 165 at one thrust passes along the line A (Fig. 22) entering and leaving the main layer 168 of goods at the same side, but does not enter the superimposed layer 169. At the next thrust the needle is moved laterally by the cam 36 so as to pass along the line B entering the edge or underside of the superimposed layer and emerging from the surface thus piercing the said superimposed layer transversely. By sufficiently tightening the tension the edge of the superimposed portion 169 is drawn under so that the stitch is concealed, or almost so on the side of the goods from which the stitch is done.

In addition to the above advantages the diagonal stitch obtained by the angular presentation of the goods secures greater binding effect and covering capacity than can be obtained by a straight stitch. The side pointed needle, which I prefer to use, necessarily has all the bevel on one side, which side is turned away from the back-guide and hook. In thrusting the needle through thick goods the bevel tends to deflect the needle toward the hook, hence the hook is provided with the recessed deflecting surface 158. As the deflecting surface is downward or toward the needle i. e. lies in the direction of the length of the needle as the needle enters the periphery, the needle will not strike the periphery of the hook and become broken, but will be guided into a vertical position by means of the said deflecting surface, and thus be guided back of the bridge 160. As the hook rotates the thread in the needle will be cleared by the path 159 thus preventing its being chafed between the hook and needle. The bridge 160 supports the point of the needle while the loop is being taken by the beak 161 of the hook. The inclined position of the hook together with the offset 157 causes the loop to be thrown onto the beveled cast-off surface 155 which causes the loop to fall over the face of the hook and away from in place of around the hook. The motion of the rock shaft 58 is communicated to the lever 84. The first movement of this lever is on the pivot 86 and causes the walking foot 83 to clamp the goods between itself and the feed dog 79 which being actuated by the same source of motion comes downward to meet the walking foot 83. As soon as this has taken place the movement of the lever will be shifted from the pivot 86 to the pivot 85 and the presser foot 99 will be caused to recede from the work plate 91 so that the goods will be held only between the walking foot and the feed dog. The movement of the rock shaft 46 through the rocker arm 78 will now cause the two parts 60 and 61 of the back guide to recede and at the same time the feed dog will be carried with them as it is pivoted to the part 61. This will feed the lower portion of the goods, slack being furnished by the receding of the back guide; the main body of the goods resting on the arm 31, however, will not be moved. When this taking up of the slack, caused by the receding of the back guide bar, has been accomplished the rock shafts 53 and 58, which are both controlled by the cam 34, will move allowing the feed dog 79 to return within the arm 31 and also withdrawing the walking foot 83 and allowing the presser foot 99 to clamp the goods against the work plate 91. After such clamping has taken place the rocker arm 78 recedes allowing the guides 60 and 61 to be forced forward by the springs 71, thus feeding the goods for the next stitch. This movement of the goods also has a straightening effect upon the goods, preventing it from remaining in a bent or folded condition.

The two parts of the back guide can be independently adjusted so that the two rows of stitching may be made at the proper distance from the face of the said back guide. In order to adjust the faces of the back guide one of the rods 73 is turned by means of the slot 74 so as to move the threaded head 75 away from the end of the sleeve 68. The sleeve 68 can now be adjusted to the proper distance by means of the milled head 72, and the sleeve can be locked in position by means of the rod 73. The collar 70 on the sleeve 68 furnishes a stop for positively limiting the forward movement of the back guide. Besides securing the proper distance of the two rows of stitches from the back guide, the independent adjustability of the two parts of the guide is also of advantage in securing even feeding of the main and superimposed layers of goods. If both parts of the guide have the same amount of movement the superimposed layer of goods will be fed slightly faster than the main layer on account of the extra peripheral travel of said superimposed layer, when passing around the back guide. By so adjusting the part of the guide acting upon the main layer that it will have slightly more movement than the other part extra feed is imparted to the layer to overcome the above difficulty and thus prevent drawing and unequal feeding of the goods. This difficulty is also partially overcome by the straightening effect caused by the forward movement of the guide as previously explained. The main object in having the faces of the two parts of the guide arranged at an angle to form a reëntrant working face is to facilitate the sewing of curved or irregular shapes, such as the curved bottom of trousers. Owing to this reëntrant face the goods can be moved laterally in either direction for some distance thus changing the line of feed and causing the stitch to follow the curved shape of the goods. This feature is also of some advantage in sewing in a straight line as it helps to guide the goods.

In order to move the rotary hook away from the back guide to allow the insertion or removal of the goods, the chain 111 is operated by means of a foot treadle or any other suitable way. This draws the presser foot 99 away from the work plate 91 by means of the link 110 and at the same time through the rod 112 moves the lever 144. The first movement of the lever is on its pivot and causes the detent 146 to be moved out of engagement with the stop 147. The rest of the movement causes the hook and gear case to swing around the shaft 38, thus moving the hook case away from the back guide. When it is desired to move the hook case without releasing the presser foot the forwardly extending lever 145 is raised by hand; swinging the hook case away in the same manner as above described, but not affecting the presser foot 99.

Many of the features shown and described in the present application are claimed in my prior patents No. 731,695 of June 23, 1903, and No. 746,853 of January 27, 1900, and hence the said features are not claimed in the present application.

Having fully described my invention, what I claim as new and desire to secure by Letters Patent of the United States, is;

1. In a sewing machine for blind stitching, the combination with stitch-forming mechanism, of a back guide having a reëntrant working face, and means for feeding the goods across said face.

2. In a sewing machine for blind stitching, the combination with stitch forming mechanism, of a yieldingly mounted back guide having a reëntrant working face and means for feeding the goods across said face.

3. A sewing machine for blind sitching, the combination with stitch-forming mechanism, of a back guide provided with two working faces arranged at a reëntrant angle to each other, said faces being at different places in the length of the guide, and means for feeding the goods across said guide.

4. In a sewing machine for blind stitching, the combination with stitch-forming mechanism, of a yieldingly mounted back guide provided with two working faces arranged at an angle to each other, said faces being at different places in the length of the guide, and means for feeding the goods across said guide.

5. In a sewing machine for blind stitching, the combination with stitch-forming mechanism, of a back guide provided with two working faces arranged at different places in the length of the guide and mounted to yield independently, and means for feeding the goods across said guide.

6. In a sewing machine for blind stitching, the combination with stitch-forming mechanism, of a yieldingly mounted back guide, means for reciprocating said guide, and adjustable means for limiting the forward movement of said guide.

7. In a sewing machine for blind stitching, the combination with stitch-forming mechanism, of a yieldingly mounted back guide provided with two working faces arranged at an angle to each other, said faces being at different places in the length of the guide, adjustable means for limiting the forward movement of said guide, and means for feeding the goods across the guide.

8. In a sewing machine for blind stitching, the combination with stitch-forming mechanism, of a back guide provided with two working faces, and means for independently adjusting said working faces.

9. In a sewing machine for blind stitching, the combination with stitch-forming mechanism, of a back guide provided with two working faces arranged at different places in the length of the guide to yield independently, adjustable means for limiting the forward movement of said guide, and means for feeding the goods across said guide.

10. In a sewing machine for blind stitching, the combination with stitch-forming mechanism, of a back guide provided with two working faces, said working faces being arranged to yield independently, and independent means for adjustably limiting the forward movement of said working faces.

11. In a sewing machine for blind stitching, the combination with stitch-forming mechanism, of a back guide provided with two working faces arranged at an angle to each other, said working faces being mounted to yield independently, and independent means for adjustably limiting the forward movement of said working faces.

12. In a sewing machine for blind stitching, a needle, a back guide around which the goods are fed, said back guide being stationary while said needle is in the goods, and means for reciprocating said back guide in a direction transverse to the path of reciprocation of the needle while said needle is out of engagement with the goods.

13. In a sewing machine for blind stitching, a needle, a back guide having two working faces around which the goods are fed, said back guide being stationary while the needle is in the goods, and means for reciprocating the back guide in a direction transverse to the path of reciprocation of the needle while said needle is out of engagement with the goods.

14. In a sewing machine for blind stitching, the combination with stitch forming mechanism for forming two rows of stitches in the goods, of means for independently adjusting the depth of said rows of stitches in the goods.

15. In a sewing machine for blind stitching, the combination with stitch-forming mechanism including a needle having two paths of reciprocation for forming two rows of stitches in the goods, of means for independently adjusting the depth of said rows of stitches in the goods.

16. In a sewing machine for blind stitching, the combination with a back guide, of means for forming two rows of stitches adjacent to the face of said back guide, and independent means for adjusting the distance between each of said rows of stitches and the back guide.

17. In a sewing machine for blind stitching, the combination with a reciprocating and laterally vibrating needle, of a back guide having a reëntrant working face, and means for feeding the goods across said guide.

18. In a sewing machine for blind stitching, the combination with a reciprocating and laterally vibrating needle, of a back guide provided with two working faces arranged at an angle to each other, said faces being at different places in the length of the guide, and means for feeding the goods across said guide.

19. In a sewing machine for blind stitching, the combination with a reciprocating and laterally vibrating needle, of a yieldingly mounted back guide provided with two working faces at an angle to each other, said faces being at different places in the length of the guide, and means for feeding the goods across said guide.

20. In a sewing machine for blind stitching, the combination with a reciprocating and laterally vibrating needle, of a back guide provided with two independently yielding working faces arranged at different places in the length of the guide.

21. In a sewing machine for blind stitching, the combination with a reciprocating and laterally vibrating needle, of a back guide provided with two independently yielding working faces arranged at an angle to each other, said faces being at different places in the length of the guide.

22. In a sewing machine for blind stitching, the combination with a yieldingly mounted back guide, of means for feeding the goods across the guide, and means for forming two rows of stitches adjacent to the face of said back guide.

23. In a sewing machine for blind stitching, the combination with a back guide provided with two working faces arranged at an angle to each other, said faces being at different places in the length of the guide, of means for forming two rows of stitches unequally distant from said faces, and means for feeding the goods across the face of said guide.

24. In a sewing machine for blind stitching, the combination with a back guide provided with two working faces, of a reciprocating and laterally vibrating needle, and means for independently adjusting said working faces.

25. In a sewing machine for blind stitching, the combination with a back guide provided with two independently movable working faces arranged at an angle to each other, of a reciprocating and laterally vibrating needle for forming two rows of stitches adjacent to the face of said back guide, and means for independently adjusting the movement of said faces toward said needle.

26. In a sewing machine for blind stitching, the combination with stitch-forming mechanism, of a back guide around which the goods are fed, a clamping device for holding the goods, and means for reciprocating said back guide to feed the goods.

27. In a sewing machine for blind stitching, the combination with stitch-forming mechanism, of a back guide around which the goods are fed, and means for causing a greater feed of the goods around one part of said guide than another.

28. In a sewing machine for blind stitching, the combination with a stitch-forming mechanism, of a two-part reciprocating back guide around which goods are fed, and means for imparting greater movement to one part of said guide than to the other.

29. In a sewing machine for blind stitching, the combination with stitch-forming mechanism, of a back guide, a reciprocating feed dog, a presser foot, means for holding said presser foot in position, and means for throwing said presser foot out of operation while said feed dog is feeding the goods.

30. In a sewing machine for blind stitching, the combination with stitch-forming mechanism, of a reciprocating back guide, a feed dog, and a walking foot coöperating with said feed dog.

31. In a sewing machine for blind stitching, the combination with stitch-forming mechanism, of a reciprocating back guide, a feed dog, and means for simultaneously actuating said back guide and feed dog while the latter is in engagement with the goods.

32. In a sewing machine for blind stitching, the combination with stitch-forming mechanism, of a reciprocating back guide, a feed dog, means for simultaneously actuating said back guide and feed dog, and a walking foot coöperating with said feed dog.

33. In a sewing machine for blind stitching, the combination with stitch-forming mechanism, of a reciprocating back guide, and a feed dog carried by said back guide.

34. In a sewing machine for blind stitching, the combination with stitch-forming mechanism, of a reciprocating back guide, a feed dog carried by said back guide, and a walking foot coöperating with said feed dog.

35. In a sewing machine for blind stitching, the combination with stitch-forming mechanism, of a reciprocating back guide, a feed dog, means for simultaneously actuating said back guide and feed dog, a walking foot coöperating with said feed dog, and a presser foot for holding the work during the forward movement of said back guide.

36. In a sewing machine for blind stitching, the combination with stitch-forming mechanism, of a back guide, a reciprocating feed dog, a walking foot coöperating with said feed dog beyond said guide, and connections for actuating said feed dog and walking foot.

37. In a sewing machine for blind stitching, the combination with stitch-forming mechanism, of a back guide, a reciprocating feed dog, a walking foot coöperating with said feed dog beyond said guide, and connections for actuating said feed dog and walking foot from the same source of motion.

38. In a sewing machine for blind stitching, the combination with stitch-forming mechanism, of a reciprocating back guide, a feed dog, operating mechanism for simultaneously actuating said back guide and feed dog while the latter is in engagement with the goods, and adjusting means for regulating the movement of both said back guide and feed dog.

39. In a sewing machine for blind stitching, the combination with a back guide, of feed mechanism, stitch-forming mechanism provided with a needle the thrust of which is in a direction opposite to the feed of the goods, a main presser foot coöperating with said feed mechanism, and an independently movable auxiliary presser foot opposing the thrust of said needle.

40. In a sewing machine for blind stitching, the combination with a back guide, of feed mechanism, stitch-forming mechanism provided with a needle the thrust of which is in a direction opposite to the feed of the goods, a main presser foot coöperating with said feed mechanism, and an independently movable auxiliary presser foot yieldingly mounted on said main presser foot and opposing the thrust of the needle.

41. In a sewing machine for blind stitching, the combination with stitch-forming mechanism, of a back guide, means for feeding the goods around said guide, a main presser foot coöperating with the feed mechanism, and a spring actuated auxiliary presser foot pivotally mounted on said main presser foot.

42. In a sewing machine, the combination with a reciprocating needle, of a rotary hook containing a bobbin and inclined to the path of reciprocation of said needle, the rear face of said hook coöperating with said needle to take the loop.

43. In a sewing machine for blind stitching, the combination with a back guide, of a reciprocating needle, and a rotary hook inclined to the path of reciprocation of said needle, said hook being arranged to take the loop from the side of the needle toward said back guide.

44. In a sewing machine for blind stitching, the combination with a back guide, of a reciprocating needle, and a rotary hook inclined to the path of reciprocation of said needle, the rear face of said hook being arranged to take the loop from the side of the needle toward the back guide.

45. In a sewing machine for blind stitching, the combination with a guide, of stitch-forming mechanism including a needle, and means for holding said needle under tension and in alinement while passing said guide.

46. In a sewing machine for blind stitching, the combination with stitch-forming mechanism including a needle arranged with its axis at an angle to the path of reciprocation, of a guide for the goods, and a needle guide for deflecting said needle.

47. In a sewing machine for blind stitching, the combination with a guide for the goods, of stitch-forming mechanism including a needle having its point between its center line and the said guide, and a needle guide for deflecting said needle before it enters the material.

48. In a sewing machine for blind stitching, the combination with stitch-forming mechanism including a needle, having its point substantially in line with its side, of a guide for the goods, and a needle guide for deflecting said needle before it enters the material.

49. In a sewing machine for blind stitching, the combination with a back guide, of stitch-forming mechanism including a needle having its point between its center line and the said guide, and a needle guide for deflecting said needle before it enters the material.

50. In a sewing machine for blind stitching, the combination with stitch-forming mechanism including a needle having its point substantially in line with one of its sides and having its axis inclined to the path of reciprocation, of a back guide, and a needle guide for deflecting said needle.

51. In a sewing machine for blind stitching, the combination with stitch-forming mechanism including a needle having its point substantially in line with one of its sides and having its axis inclined to the path of reciprocation, of a reciprocating back guide, a needle guide, and means for positively limiting the movement of said back guide toward said needle.

52. In a sewing machine for blind stitching, the combination with stitch-forming mechanism, of a stationary needle guide for deflecting the needle before it enters the material, a movably mounted back guide, and means positively limiting the movement of said back guide towards said needle.

53. In a sewing machine for blind stitching, the combination with stitch-forming mechanism, of a rigid needle guide for deflecting the needle before it enters the material, a movably mounted back guide, and means for positively limiting the movement of said back guide toward said needle.

54. In a sewing machine for blind stitching, the combination with stitch-forming mechanism, of a rigid needle guide for deflecting the needle before it enters the material, a movably mounted back guide, and adjustable means for positively limiting the movement of said back guide toward said needle guide.

55. In a sewing machine for blind stitching, the combination with a back-guide, of feeding mechanism, and an edge guide for directing the travel of the goods along the line inclined to the path of travel of the goods at the point of feed.

56. In a sewing machine for blind stitching, the combination with feeding mechanism, of a back guide having its face inclined to the path of feed of the goods adjacent thereto, and an edge guide inclined to the path of travel of the goods at the point of feed.

57. In a machine for blind stitching, the combination with feeding mechanism, of a back guide formed of two parts differently inclined to the path of feed of the goods, and an edge guide inclined to the path of travel of the goods at the point of feed.

58. In a sewing machine, the combination with a back guide, of feeding mechanism, and a drag foot forming an edge guide for the goods and inclined to the path of travel of the goods at the point of feed.

59. In a sewing machine for blind stitching, the combination with a back-guide, of feeding mechanism, and an edge guide for directing the travel of the goods along a line inclined to the face of said back-guide.

60. In a sewing machine for blind stitching, the combination with feeding mechanism, of a back guide having its face inclined to the path of feed of the goods adjacent thereto, and an edge guide inclined to the face of said back guide.

61. In a sewing machine for blind stitching, the combination with feeding mechanism, of a back guide formed of two parts differently inclined to the path of feed of the goods, and an edge guide inclined to the face of said back guide.

62. In a sewing machine, the combination with a back guide, of feeding mechanism, and a drag foot forming an edge guide for the goods and inclined to the face of said back guide.

63. In a sewing machine for blind stitching, the combination with a needle, of a back guide, a rotary hook mechanism mounted to move toward and away from said back guide, and a drag foot carried by said rotary hook mechanism.

64. In a sewing machine, the combination with a back guide, of feeding mechanism, a rotary hook mechanism mounted to move toward and away from the back guide, and a drag foot carried by said rotary hook mechanism and forming an edge guide for the goods and inclined to the path of travel of the goods at the point of feed.

65. In a sewing machine for blind stitching, the combination with a needle, of a back guide, a rotary hook mechanism mounted to move toward and away from said back guide, a drag foot carried by said rotary hook mechanism, and means for varying the pressure of said drag foot.

66. In a sewing machine for blind stitching, the combination with a back guide, of a needle, means for causing said needle to pass said back guide, and a rotary member provided with a deflecting surface for straightening said needle, said surface at the time of contact with said needle being inclined in the direction of the length of said needle.

67. In a sewing machine for blind stitching, the combination with a back guide, of a needle, means for causing said needle to pass said back guide under tension, and a rotary hook provided with a deflecting surface for straightening said needle.

68. In a sewing machine for blind stitching, the combination with a back guide, of a needle having its point substantially in line with one of its sides, a rotary hook, and a bridge carried by said hook for supporting the point of the needle while the beak of the hook is passing said needle.

69. In a sewing machine for blind stitching, the combination with a back guide, of a needle having its point between its center line and said guide, a rotary hook, and a bridge carried by said hook for supporting the point of the needle while the beak of the hook is passing the needle.

70. In a sewing machine for blind stitching, the combination with a back guide, of a needle, a rotary hook having a face arranged to support the point of said needle, and a path formed in said supporting face for clearing the needle thread.

71. In a sewing machine for blind stitching, the combination with a needle, of a rotary hook inclined to the path of reciprocation of said needle, said hook having an inclined cast-off surface, and an offset for guiding the thread onto said cast-off surface.

72. In a sewing machine for blind stitching, the combination with stitch-forming mechanism, of means for presenting the goods to the needle with the edge adjacent to the needle inclined to the path of reciprocation of said needle.

73. In a sewing machine for blind stitching, the combination with stitch-forming mechanism, of a back guide, and means for feeding the goods across the face of said guide adjacent to the needle in a path inclined to said face.

74. In a sewing machine for blind stitching, the combination with stitch-forming mechanism provided with a needle having multiple paths of reciprocation, of a back guide, and means for feeding the goods across the face of said guide adjacent to the needle in the path inclined to said face.

75. In a sewing machine, the combination with stitch-forming mechanism provided with a needle having two paths of reciprocation, of means for presenting the goods to the stitch-forming mechanism with the edge adjacent to the needle inclined to both said paths of reciprocation of the needle.

76. In a sewing machine for blind stitching, the combination with stitch-forming mechanism, of means for presenting the goods to the needle with the edge adjacent to the needle inclined to the path of reciprocation of said needle, and an edge guide for the goods.

77. In a sewing machine for blind stitching, the combination with stitch-forming mechanism, of a back guide, means for feeding the goods across the face of said guide adjacent to the needle in a path inclined to said face, and an edge guide inclined to the face of said back guide.

78. In a sewing machine for blind stitching, the combination with stitch-forming mechanism provided with a needle having multiple paths of reciprocation, of a back guide, means for feeding the goods across the face of said guide adjacent to the needle in a path inclined to said face, and an edge guide inclined to the face of said back guide.

79. In a sewing machine, the combination with stitch-forming mechanism provided with a needle having two paths of reciprocation, of means for presenting the goods to the stitch-forming mechanism with the edge adjacent to the needle inclined to both said paths of reciprocation of the needle, and an edge guide for the goods.

In testimony whereof, I have hereunto set my hand and affixed my seal, in the presence of the two subscribing witnesses.

JOHN G. LEWIS. [L. S.]

Witnesses:
A. C. FOWLER,
W. A. ALEXANDER.